(12) United States Patent
Zbiciak

(10) Patent No.: US 7,890,566 B1
(45) Date of Patent: Feb. 15, 2011

(54) MICROPROCESSOR WITH ROUNDING DOT PRODUCT INSTRUCTION

(75) Inventor: Joseph R. Zbiciak, North Richland Hills, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2167 days.

(21) Appl. No.: 09/703,034

(22) Filed: Oct. 31, 2000

Related U.S. Application Data

(60) Provisional application No. 60/183,527, filed on Feb. 18, 2000.

(51) Int. Cl.
*G06F 7/38* (2006.01)

(52) U.S. Cl. .................................... 708/523

(58) Field of Classification Search .............. 708/603, 708/521, 501, 205, 523, 497, 495, 620–632, 708/300–323, 400–409, 490; 712/9
See application file for complete search history.

(56) References Cited

U.S. PATENT DOCUMENTS

| | | | | |
|---|---|---|---|---|
| 5,276,634 A * | 1/1994 | Suzuki et al. | ............... | 708/497 |
| 5,559,905 A * | 9/1996 | Greggain et al. | ............ | 708/300 |
| 5,666,300 A * | 9/1997 | Adelman et al. | ............ | 708/521 |
| 5,835,392 A * | 11/1998 | Dulong et al. | ............... | 708/404 |
| 5,854,758 A * | 12/1998 | Kosuda et al. | .............. | 708/404 |
| 5,880,984 A * | 3/1999 | Burchfiel et al. | ............. | 708/501 |
| 5,903,479 A * | 5/1999 | Schwarz et al. | ............. | 708/205 |
| 5,963,744 A * | 10/1999 | Slavenburg et al. | ............ | 712/9 |
| 5,983,256 A * | 11/1999 | Peleg et al. | .................. | 708/523 |
| 5,995,122 A * | 11/1999 | Hsieh et al. | .................. | 708/495 |
| 6,167,419 A * | 12/2000 | Saishi et al. | ................. | 708/620 |
| 6,209,012 B1 * | 3/2001 | Baudendistel | ............... | 708/209 |
| 6,243,594 B1 * | 6/2001 | Silberfenig | .............. | 455/556.1 |
| 6,385,634 B1 * | 5/2002 | Peleg et al. | .................. | 708/490 |
| 6,957,244 B2 * | 10/2005 | Jou et al. | ..................... | 708/628 |
| 2003/0088601 A1 * | 5/2003 | Pitsianis et al. | | |

OTHER PUBLICATIONS

Marc et al., Validated Roundngs of Dot Products by Sticky Accumulation, May 1997, IEEE Transactions on Computers, vol. 46, No. 5, pp. 623-629.*
Philips Electronics North America Corp., Internet Article, *TriMedia TM1300 Preliminary Data Book*, Oct. 1999, First Draft, Preliminary Information, pp. A-83 to A-85.
Philips Electronics North America Corp., Internet Article, *TriMedia TM1300 Preliminary Data Book*, Oct. 1999, First Draft, Preliminary Information, pp. A-172 to A-173.

* cited by examiner

*Primary Examiner*—Chat C Do
(74) *Attorney, Agent, or Firm*—Robert D. Marshall, Jr.; W. James Brady; Frederick J. Telecky, Jr.

(57) ABSTRACT

A functional unit in a digital system is provided with a rounding DOT product instruction, wherein a product of first pair of elements is combined with a product of second pair of elements, the combined product is rounded, and the final result is stored in a destination. Rounding is performed by adding a rounding value to form an intermediate result, and then shifting the intermediate result right. A combined result is rounded to a fixed length shorter than the combined product. The products are combined by either addition or subtraction. An overflow resulting from the combination or from rounding is not reported.

2 Claims, 6 Drawing Sheets

MICROPROCESSOR WITH ROUNDING DOT PRODUCT INSTRUCTION

This application claims priority under 35 USC §119(e)(1) of Provisional Application No. 60/183,527, filed Feb. 18, 2000.

NOTICE (C) Copyright 2000 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to microprocessors optimized for digital signal processing.

BACKGROUND

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs), for performing Inverse Discrete Cosine Transforms (IDCT), and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes multiple instruction fetch packets and multiple instruction execution packets with multiple functional units, referred to as a Very Long Instruction Word (VLIW) architecture.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are pre-designed and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner.

For example, a DSP generally has a specialized multiply-accumulate (MAC) unit in order to improve the performance of repetitive digital signal processing algorithms.

The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor with a versatile multiplier unit that improves digital signal processing performance. Aspects of the invention are specified in the claims.

An embodiment of the invention is a microprocessor with a rounding dot product instruction (DOTRS). A product of a first pair of elements is combined with a product of a second pair of elements to form a combined product. The combined product is then rounded to form an intermediate result and then right shifted to form a final result.

In another embodiment of the invention, the final result is rounded at a mid-position and shifted to a bit length less then the bit length of the combined product. In another embodiment, the rounding value is $2^{15}$, or 0x8000.

In another embodiment of the invention, an overflow that occurs during formation of the combined product or during rounding is ignored.

In another embodiment of the invention, a product of a first pair of elements and a second pair of elements is combined by addition. Another aspect of the invention combines the products by subtraction.

In another embodiment of the invention, a plurality of source element values are packed in a single register.

BRIEF DESCRIPTION OF THE DRAWINGS

Other features and advantages of the present invention will become apparent by reference to the following detailed description when considered in conjunction with the accompanying drawings in which the Figures relate to the processor of FIG. 2 unless otherwise stated, and in which.

Corresponding numerals and symbols in the different figures and tables refer to corresponding parts unless otherwise indicated.

DETAILED DESCRIPTION OF EMBODIMENTS OF THE INVENTION

Figure 1:
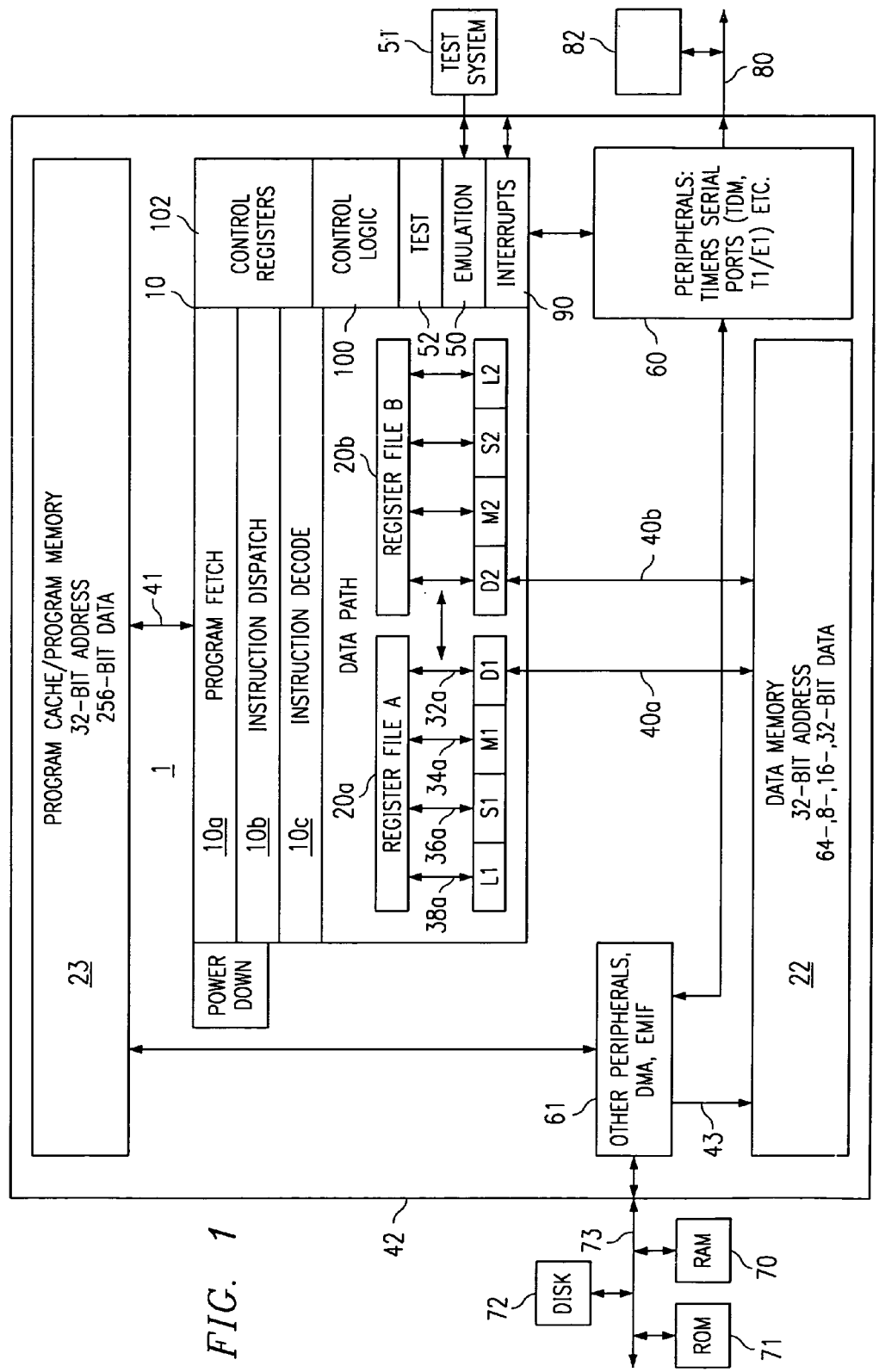
FIG. 1 is a block diagram of a digital system with a digital signal processor (DSP), showing components thereof pertinent to an embodiment of the present invention.

According to a preferred embodiment of the present invention, a microprocessor architecture is provided including certain advantageous features. FIG. 1 is a high-level block diagram of an exemplary digital system in which an embodiment of the invention is presented. In the interest of clarity, FIG. 1 shows only those portions of the digital system that may be relevant to an understanding of an embodiment of the present invention. Details of the general construction of microprocessors are well known, and may be found readily elsewhere. For example, U.S. Pat. No. 5,072,418 issued to Frederick Boutaud, et al., describes a DSP in detail and is incorporated herein by reference. Details of portions of microprocessor 1 relevant to an embodiment of the present invention are explained in sufficient detail below so as to enable one of ordinary skill in the microprocessor art to make and use the invention.

FIG. 1 is a block diagram of a digital system with a digital signal processor (DSP), microprocessor 1, showing components thereof pertinent to an embodiment of the present invention. In microprocessor 1 there are shown a central processing unit (CPU) 10, data memory 22, program memory/cache 23, peripherals 60 and an external memory interface (EMIF) with a direct memory access (DMA) 61. CPU 10 further has an instruction fetch/decode unit 10a-c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written. Instructions are fetched by fetch unit 10a from instruction memory 23 over a set of busses 41. Decoded instructions are provided from the instruction fetch/decode unit 10a-c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. In this embodiment of the present invention, two unrelated aligned double word (64 bits) load/store transfers can be made in parallel between CPU 10 and data memory 22 on each clock cycle using bus set 40a and bus set 40b. A single non-aligned double word load/store transfer is performed by scheduling a first .D unit resource and two load/store ports on a target memory. Advantageously, a second .D unit can perform 32-bit logical or arithmetic instructions in addition to the .S and .L units while the address port of the second .D unit is being used to transmit one of two contiguous addresses provided by the first .D unit.

Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331, which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22-23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller is generally used to move data between memory and peripherals within microprocessor 1 and memory and peripherals which are external to microprocessor 1.

A detailed description of various architectural features of the microprocessor 1 of FIG. 1 is provided in co-assigned U.S. Pat. No. 6,182,203 and is incorporated herein by reference. A description of enhanced architectural features and an extended instruction set not described herein for CPU 10 is provided in co-assigned U.S. Provisional Patent application Ser. No. 60/183,527 now U.S. patent application Ser. No. 09/703,096 entitled Microprocessor with Improved Instruction Set Architecture and is incorporated herein by reference.

Figure 2:
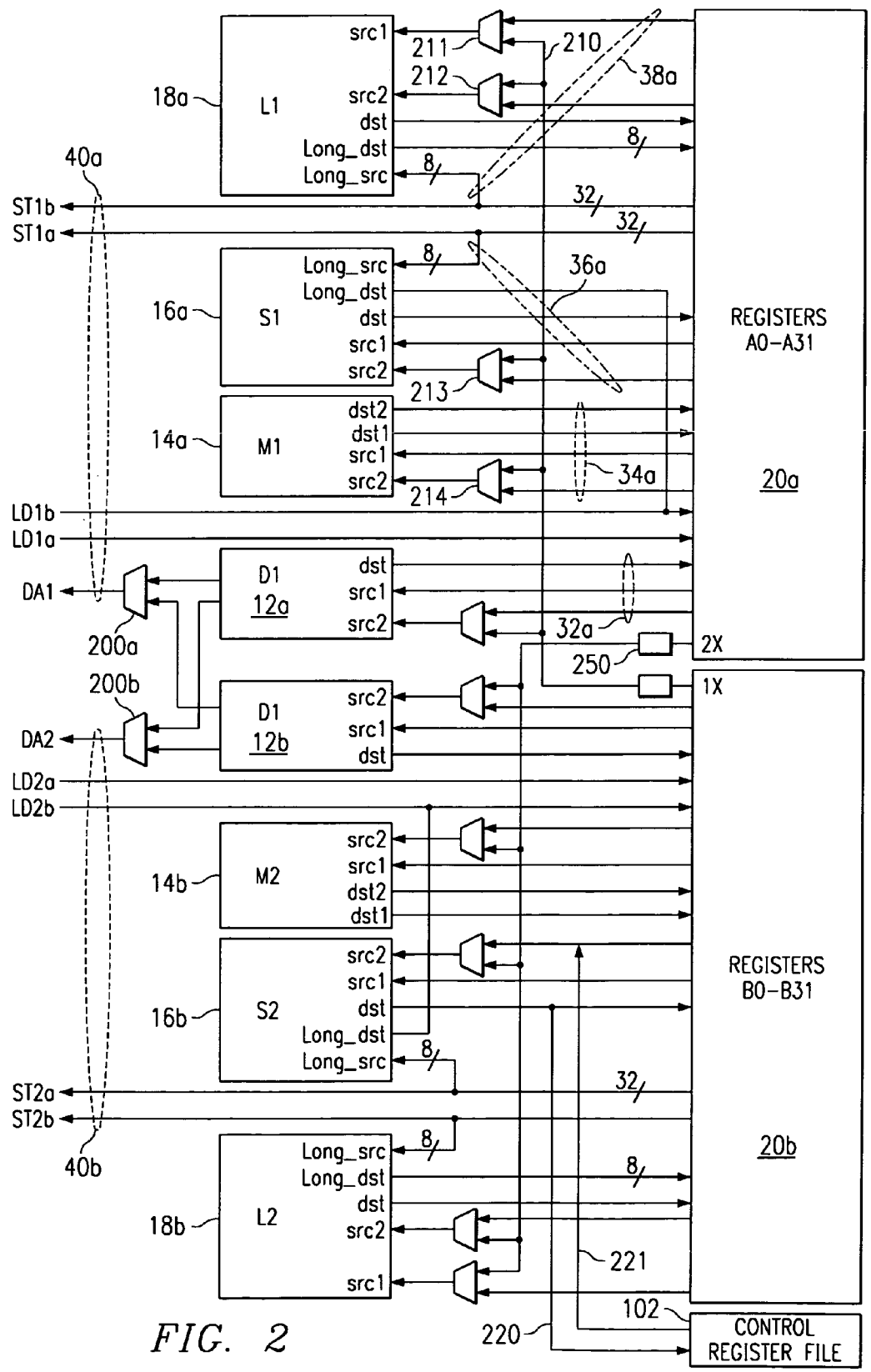
FIG. 2 is a block diagram of the functional units, data paths and register files of the DSP of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0-A31 for file A and B0-B31 for file B). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is specified first.

Table 1. 40-Bit/64-Bit Register Pairs

TABLE 1

40-Bit/64-Bit Register Pairs
Register Files

| A | B |
|---|---|
| A1:A0 | B1:B0 |
| A3:A2 | B3:B2 |
| A5:A4 | B5:B4 |
| A7:A6 | 67:B6 |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

Referring again to FIG. 2, the eight functional units in processor 10's data paths can be divided into two groups of four; each functional unit in one data path is almost identical to the corresponding unit in the other data path. The functional units are described in Table 2.

Besides being able to perform 32-bit data manipulations, processor 10 also contains many 8-bit and 16-bit data instructions in the instruction set. For example, the MPYU4 instruction performs four 8×8 unsigned multiplies with a single instruction on an M unit. The ADD4 instruction performs four 8-bit additions with a single instruction on an L unit.

Table 2. Functional Units and Operations Performed

TABLE 2

Functional Units and Operations Performed

| Functional Unit | Fixed-Point Operations |
|---|---|
| .L unit (.L1, .L2), 18a,b | 32/40-bit arithmetic and compare operations<br>32-bit logical operations<br>Leftmost 1 or 0 counting for 32 bits<br>Normalization count for 32 and 40 bits<br>Byte shifts<br>Data packing/unpacking |

TABLE 2-continued

Functional Units and Operations Performed

| Functional Unit | Fixed-Point Operations |
|---|---|
| | 5-bit constant generation<br>Paired 16-bit arithmetic operations<br>Quad 8-bit arithmetic operations<br>Paired 16-bit min/max operations<br>Quad 8-bit min/max operations |
| .S unit (.S1, .S2) 16a,b | 32-bit arithmetic operations<br>32/40-bit shifts and 32-bit bit-field operations<br>32-bit logical operations<br>Branches<br>Constant generation<br>Register transfers to/from control register file (.S2 only)<br>Byte shifts<br>Data packing/unpacking<br>Paired 16-bit compare operations<br>Quad 8-bit compare operations<br>Paired 16-bit shift operations<br>Paired 16-bit saturated arithmetic operations<br>Quad 8-bit saturated arithmetic operations |
| .M unit (.M1, .M2) 14a,b | 16 × 16 multiply operations<br>16 × 32 multiply operations<br>Bit expansion<br>Bit interleaving/de-interleaving<br>Quad 8 × 8 multiply operations<br>Paired 16 × 16 multiply operations<br>Paired 16 × 16 multiply with add/subtract operations<br>Quad 8 × 8 multiply with add operations<br>Variable shift operations<br>Rotation<br>Galois Field Multiply |
| .D unit (.D1, .D2) 12a,b | 32-bit add, subtract, linear and circular address calculation<br>Loads and stores with 5-bit constant offset<br>Loads and stores with 15-bit constant offset (.D2 only)<br>Load and store double words with 5-bit constant<br>Load and store non-aligned words and double words<br>5-bit constant generation<br>32-bit logical operations |

Most data lines in the CPU support 32-bit operands, and some support long (40-bit) and double word (64-bit) operands. Each functional unit has its own 32-bit write port into a general-purpose register file 20a, 20b (Refer to FIG. 2). All units ending in 1 (for example, .L1) write to register file A 20a and all units ending in 2 write to register file B 20b. Each functional unit has two 32-bit read ports for source operands src1 and src2. Four units (.L1, .L2, .S1, and .S2) have an extra 8-bit-wide port (long-dst) for 40-bit long writes, as well as an 8-bit input (long-src) for 40-bit long reads. Because each unit has its own 32-bit write port dst, when performing 32 bit operations all eight units can be used in parallel every cycle. Since each multiplier can return up to a 64-bit result, two write ports (dst1 and dst2) are provided from the multipliers to the register file.

Table 3 defines the mapping between instructions and functional units for a set of basic instructions included in the present embodiment. Table 4 defines a mapping between instructions and functional units for a set of extended instructions in an embodiment of the present invention. Alternative embodiments of the present invention may have different sets of instructions and functional unit mapping. Tables 3 and 4 are illustrative and are not exhaustive or intended to limit various embodiments of the present invention.

Table 3. Instruction to Functional Unit Mapping of Basic Instructions

TABLE 3

Instruction to Functional Unit Mapping of Basic Instructions

| .L Unit | .M Unit | .S Unit | .D Unit |
|---|---|---|---|
| ABS | MPY | ADD | ADD |
| ADD | SMPY | ADDK | ADDA |
| AND | | ADD2 | LD mem |
| CMPEQ | | AND | LD mem (15-bit offset) (D2 only) |
| CMPGT | | B disp | MV |
| CMPGTU | | B IRP | NEG |
| CMPLT | | B NRP | ST mem |
| CMPLTU | | B reg | ST mem (15-bit offset) (D2 only) |
| LMBD | | CLR | SUB |
| MV | | EXT | SUBA |
| NEG | | EXTU | ZERO |
| NORM | | MVC | |
| NOT | | MV | |
| OR | | MVK | |
| SADD | | MVKH | |
| SAT | | NEG | |
| SSUB | | NOT | |
| SUB | | OR | |
| SUBC | | SET | |
| XOR | | SHL | |
| ZERO | | SHR | |
| | | SHRU | |
| | | SSHL | |
| | | STP (S2 only) | |
| | | SUB | |
| | | SUB2 | |
| | | XOR | |
| | | ZERO | |

Table 4, Instruction to Functional Unit Mapping of Extended Instructions

TABLE 4

Instruction to Functional Unit Mapping of Extended Instructions

| .L unit | .M unit | .S unit | .D unit |
|---|---|---|---|
| ABS2 | AVG2 | ADD2 | ADD2 |
| ADD2 | AVGU4 | ADDKPC | AND |
| ADD4 | BITC4 | AND | ANDN |
| AND | BITR | ANDN | LDDW |
| ANDN | DEAL | BDEC | LDNDW |
| MAX2 | DOTP2 | BNOP | LDNW |
| MAXU4 | DOTPN2 | BPOS | MVK |
| MIN2 | DOTPNRSU2 | CMPEQ2 | OR |
| MINU4 | DOTPNRUS2 | CMPEQ4 | STDW |
| | DOTPRSU2 | CMPGT2 | |
| | DOTPRUS2 | CMPGTU4 | |
| MVK | DOTPSU4 | CMPLT2 | STNDW |
| | DOTPUS4 | | |
| OR | DOTPU4 | CMPLTU4 | STNW |
| PACK2 | GMPY4 | MVK | SUB2 |
| PACKH2 | MPY2 | OR | XOR |
| PACKH4 | MPYHI | PACK2 | |
| PACKHL2 | MPYHIR | PACKH2 | |
| | MPYIH | | |
| | MPYIHR | | |
| PACKL4 | MPYIL | PACKHL2 | |
| | MPYILR | | |
| | MPYLI | | |
| PACKLH2 | MPYLIR | PACKLH2 | |
| SHLMB | MPYSU4 | SADD2 | |
| | MPYUS4 | | |
| SHRMB | MPYU4 | SADDU4 | |
| SUB2 | MVD | SADDSU2 | |
| | | SADDUS2 | |
| SUB4 | ROTL | SHLMB | |
| SUBABS4 | SHFL | SHR2 | |

TABLE 4-continued

Instruction to Functional Unit Mapping of Extended Instructions

| .L unit | .M unit | .S unit | .D unit |
|---|---|---|---|
| SWAP2 | SMPY2 | SHRMB | |
| SWAP4 | SSHVL | SHRU2 | |
| UNPKHU4 | SSHVR | SPACK2 | |
| UNPKLU4 | XPND2 | SPACKU4 | |
| XOR | XPND4 | SUB2 | |
| | | SWAP2 | |
| | | UNPKHU4 | |
| | | UNPKLU4 | |
| | | XOR | |

Pipeline Operation

The instruction execution pipeline of DSP 1 has several key features which improve performance, decrease cost, and simplify programming, including: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with the same relative pipeline phase difference; and load and store addresses appear on the CPU boundary during the same pipeline phase, eliminating read-after-write memory conflicts.

A multi-stage memory pipeline is present for both data accesses in memory 22 and program fetches in memory 23. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited only by stalls from the memory subsystems or interrupts. The reasons for memory stalls are determined by the memory architecture. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, memory stalls can cause CPU cycles to extend over multiple clock cycles. To understand the machine state at CPU cycle boundaries, one must be concerned only with the execution phases (E1-E5) of the pipeline. The phases of the pipeline are described in Table 5.

Table 5. Pipeline Phase Description

TABLE 5

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
| | Execute 2 | E2 | Load instructions: address is sent to memory† Store instructions and STP: address and data are sent to memory† Single-cycle instructions that saturate results set the SAT bit in the Control Status Register (CSR) if saturation occurs. † Multiply instructions: results are written to a register file† | Stores STP Multiplies |
| | Execute 3 | E3 | Data memory accesses are performed. Any multiply instruction that saturates results sets the SAT bit in the Control Status Register (CSR) if saturation occurs. † | |
| | Execute 4 | E4 | Load instructions: data is brought to CPU boundary† Four-cycle instructions: results are written to a register file† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

Figures 3A, 3B:
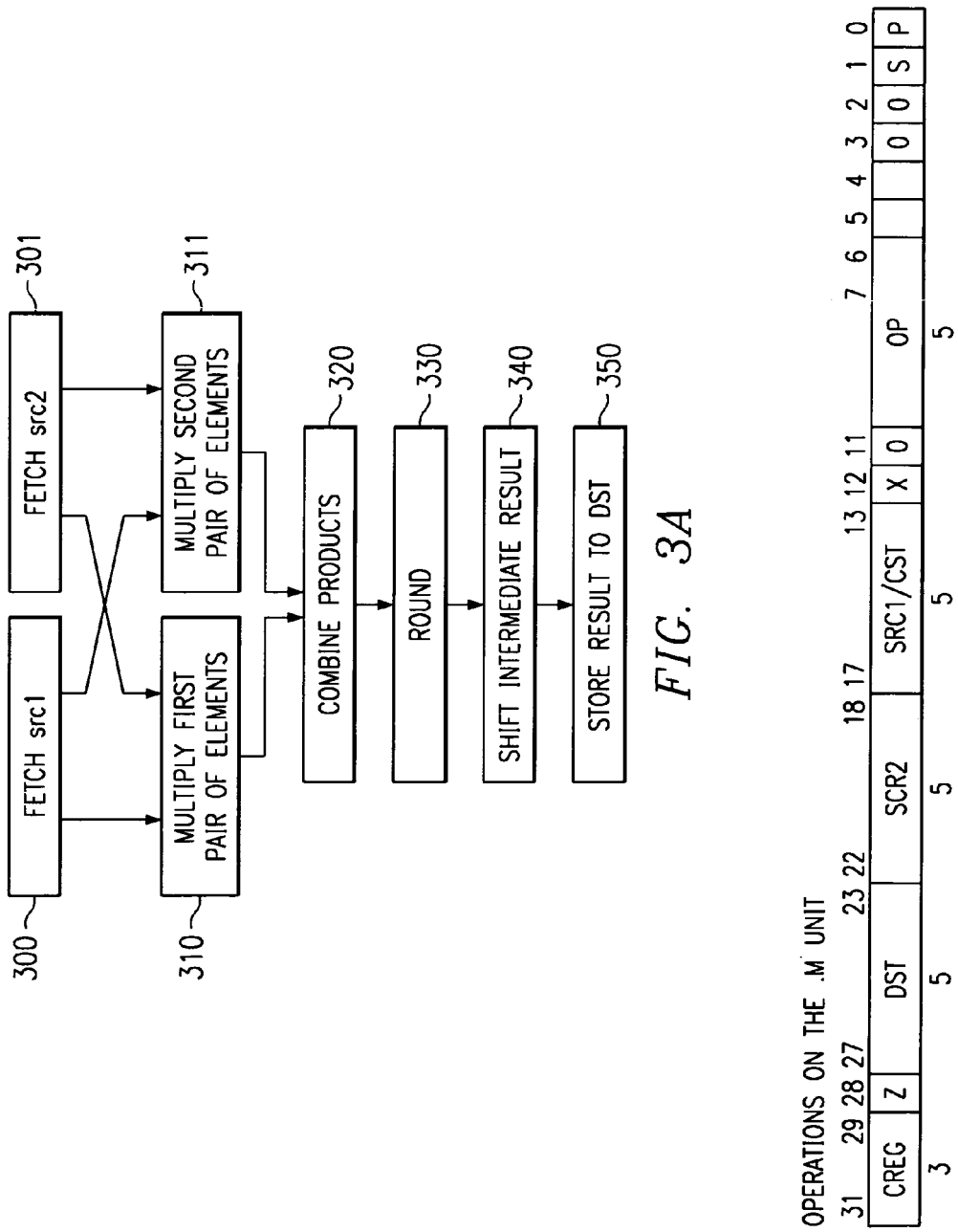
FIG. 3A is a flow chart of a dot product instruction with rounding and shifting executed on the DSP of FIG. 1, according to an aspect of the present invention.
FIG. 3B illustrates an instruction format for the rounding dot product instructions of FIG. 3A.

FIG. 3A is a flow chart of a dot product instruction with rounding and shifting executed on either of multiplier units M1 and M2 of the DSP of FIG. 1, according to an aspect of the present invention. In this embodiment, multiplier units M1, M2 are each similar and will be described in more detail with reference to FIG. 4. A rounding dot product instruction can be executed on either one of the multiply units M1, M2 during any execution cycle of the instruction execution pipeline, unless a resource conflict limits inclusion of a rounding dot product instruction within a given execution packet. Advantageously, in this embodiment, two rounding dot products can be simultaneously executed during the same execution cycles on both M1 and M2, subject to resource constraints. Other embodiments of the invention may provide different compliments of multiply units, such as only one multiply unit, or three or more, for example. Therefore, in the following description of the rounding dot product instruction it is to be understood that even though the operation will be described with reference to the M1 functional unit, operation on the M2 functional unit is similar.

Referring again to FIG. 2 and FIG. 3A, the operation of a dot product instruction with round and shift will now be described in more detail. During steps 300 and 301, two source operands are fetched during an E1 execute phase of the instruction execution pipeline. A first source operand is fetched from a register in register file A 20a in step 300, while in step 301a second source operand is fetched from a register in either register file A or register file B 20b by appropriate control of cross pass selection multiplexor 214. Each source operand is a 32-bit value, but is interpreted as two elements each having 16-bit values packed into one 32-bit operand. A "src1" field and a "src2" field in the dot product instruction specifies which register is selected for the first and second operands, respectively.

In step 310, a first pair of elements are multiplied together to form a first product. The most significant 16-bit value of the first source operand and the most significant 16-bit value of the second source operand are multiplied together to form a 32-bit first product. In step 311, a second pair of elements are multiplied together to form a second product. The least significant 16-bit value of the first source operand and the least significant 16-bit value of the second source operand are multiplied together to form a 32-bit second product. The two products are formed simultaneously by a pair of multiplier circuits in the M1 functional unit during the E1 execute phase. In this embodiment, one of the 16-bit values of each pair of elements is treated as a signed number and the other 16-bit value of each pair of elements is treated as an unsigned number. Each product is treated as a signed integer value.

In step 320, the first product is combined with the second product to form a 32-bit combined product. In the present embodiment, a dot product with shift and round (DOTRS)

instruction directs the first product to be added to the second product in step 320. A different instruction, dot product with negate, shift and round (DOTPNRS) directs the second product to be subtracted from the first product in step 320.

In step 330, the combined product is rounded by adding a rounding value to form an intermediate value. A rounding value of 0x8000 ($2^{15}$) is added to the combined product to form the intermediate value. This has the effect of rounding the 32-bit combined product at bit position 16. The intermediate value is treated as a signed integer value; an integer may have any value in the range of $+2^{31}-1$ down to $-2^{31}$. Thus, when the rounding value is added, the intermediate value may wrap (overflow) from the largest positive value to the smallest negative value. When such an overflow occurs, it is not reported in the status control register, and does not produce exception processing.

In step 340, the intermediate result is right shifted by sixteen bits and sign extended to form a 32-bit final result. Thus, the shifting truncates a selected number of least significant bits of the intermediate result such that the final result is shorter than the combined product, although it is sign extended to 32-bits for storage in a 32 bit register. The final result is then written to a register in register file A specified by a "dst" field in the dot product instruction during an E4 execution phase of the instruction execution pipeline of the processor, resulting in three delay slots for execution of these instructions.

In this embodiment, rounding at bit 16 of the 32-bit combined product with a rounding value of 0x8000 ($2^{15}$) and right shifting sixteen bits is performed in order to reduce processing time required for applications such as IDCT. The inventor of the present invention discovered that source code written for applications such as IDCT in the known C programming language often contains a sequence of instructions such as the following:

```
Q1 = (F1 * C7 - F7 * C1 + 0x8000) >> 16;
Q0 = (F5 * C3 - F3 * C5 + 0x8000) >> 16;
S0 = (F5 * C5 + F3 * C3 + 0x8000) >> 16;
S1 = (F1 * C1 + F7 * C7 + 0x8000) >> 16;
```

Advantageously, by using the dot product instructions of the present invention, the C-code sequence above can be directly replaced with a sequence similar to the following, for example, to reduce instruction count and improve processing performance:

```
Q1 = _dotpnrsu2 (F17, C71) ;
Q0 = _dotpnrsu2 (F53, C35) ;
S0 = _dotprsu2 (F53, C53) ;
S1 = _dotprsu2 (F17, C17) ;
```

FIG. 3B illustrates an instruction format for the rounding dot product instructions for execution on the processor of FIG. 1.

All instructions can be conditional. The condition is controlled by a 3-bit (creg) field specifying the register tested, and a 1-bit field (z) specifying a test for zero or nonzero. The four MSBs of every opcode are creg and z. The register is tested at the beginning of the E1 pipeline stage for all instructions. The pipeline is described later herein. If z=1, the test is for equality with zero. If z=0, the test is for nonzero. The case of condition register field (creg)=0 and z=0 is treated as always true to allow instructions to be executed unconditionally.

Referring still to FIG. 3, the present embodiment defines several rounding dot product instructions that are specified by the OP field, as described in Table 6, while several examples are provided in Table 7.

Table 6. Rounding Dot Product Instructions

TABLE 6

| Opcode | Description | operation |
|---|---|---|
| DOTPRSU2 | Dot product with shift and round, signed by unsigned packed 16-bit | (((sa_hi * ub_hi) + (sa_lo * ub_lo)) + 0x8000) >> 16 |
| DOTPNRSU2 | Dot product with negate, shift and round, signed by unsigned packed 16-bit | (((sa_hi * ub_hi) − (sa_lo * ub_lo)) + 0x8000) >> 16 |

Table 7. Rounding Dot Product Examples

TABLE 7

| | Rounding Dot Product Examples | |
|---|---|---|
| Source operand values | DOTPRSU2 result: DOTPRSU2 .M A12, A23, A11 | DOTPNRSU2 result: DOTPNRSU2 .M A12, A23, A11 |
| A12 == 0x7fff8000 A23 == 0xffffffff | A11 <== 0xffffffff | A11 <== 0xfffffffe |
| A12 == 0x7fff7fff A23 == 0xffffffff | A11 <== 0xfffffffd | A11 <== 0x00000002 |
| A12 == 0x80007fff A23 == 0xffffffff | A11 <== 0xffffffff | A11 <== 0x00000000 |
| A12 == 0x37ff2ade A23 == 0xabcddcba | A11 <== 0x00004a8a | A11 <== 0x0000009e |

Figure 4:
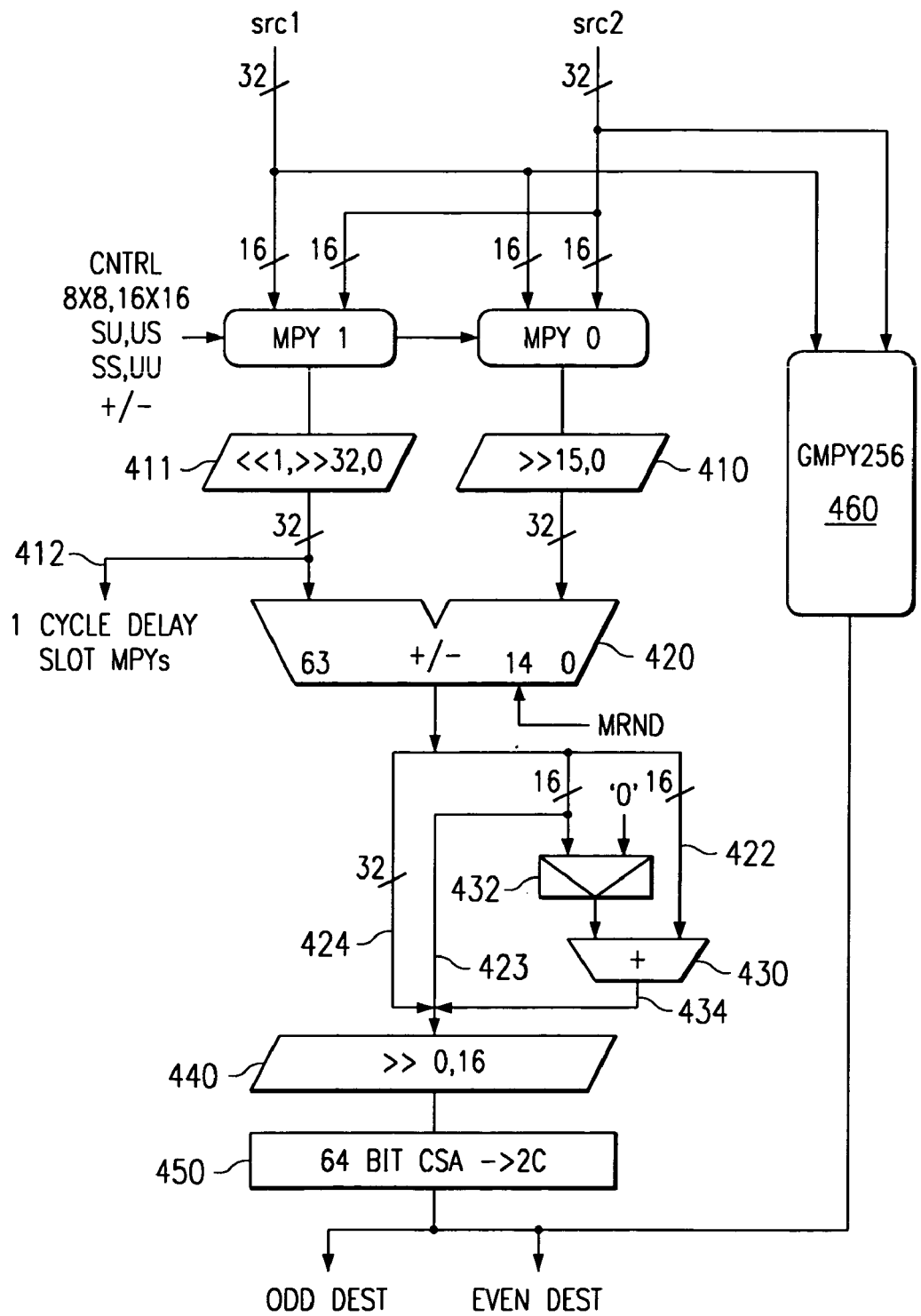
FIG. 4 is a block diagram of a pair of multipliers in an M unit of the DSP of FIG. 1.

FIG. 4 is a block diagram of a pair of multipliers in an M unit of the DSP of FIG. 1. DSP 1 includes two M units, M1, M2 which are similar in form and functions. In the following descriptions, it is to be understood that descriptions of the M unit refers to each M unit M1 and M2. In this embodiment, the M unit includes a pair of 16 by 16 multipliers mpy0, mpy1 and auxiliary hardware to enable a large number of multiply functions. M unit receives two register inputs (src1 and src2) and generates a 64 bit output to an even/odd pair of registers. Each multiplier mpy0, mpy1 receives two 16 bit inputs. These may be independently selected as the upper/lower 16 bits of the 32 bit data word recalled from the src1 and src2 operand registers. Each multiplier uses part of src1 and part of src2. The part used (upper/lower 16 bits) is independently selectable via op code. Each multiplier of this embodiment has a size input enabling selection of a single 16 by 16 bit multiply or a pair of 8 by 8 bit multiplies, but this is not germane to the present invention.

When a rounding dot product is executed, two source operands are fetched during an E1 execute phase of the instruction execution pipeline. A first source operand is fetched from a register in register file A 20a, while a second source operand is fetched from a register in either register file A or register file B 20b by appropriate control of cross pass selection multiplexor 214. Each source operand is a 32-bit value, but is interpreted as two 16-bit values packed into one 32-bit operand. A "src1" field and a "src2" field in the rounding dot product instruction specifies which register is selected for the first and second operands, respectively. The most significant 16-bit value of the first source operand and the most significant 16-bit value of the second source operand are multiplied together by mpy1 to form a 32-bit first product. The least significant 16-bit value of the first source operand and the least significant 16-bit value of the second source operand are multiplied together by mpy0 to form a 32-bit second product. The two products are formed simultaneously by the pair of multiplier circuits during the E1 execute phase of the instruction execution pipeline. In this embodiment, one of the 16-bit values of each pair of elements is treated as a signed number and the other 16-bit value of each pair of elements is treated as an unsigned number. Each product is treated as a signed integer value.

The redundant, sign/magnitude coded output of the two multipliers go to shift hardware 410, 411, respectively. The shifters have fixed shift functions coded in op code of certain instructions. These are selected from a limited set of shifts. Shifter 410 corresponding to mpy0 may select a 0 bit shift or a 15 bit right shift. Shifter 411 corresponding to mpy1 may select 0 bit shift, a 1 bit left shift, or a 32 bit right shift. The shift operation may generally be applied to the separate upper/lower 16 bit parts of the product of each multiplier. When a rounding dot product instruction is executed, shifter 410 is set to provide a 0 bit shift and shifter 411 is set to provide a 32-bit right shift so that both products are normalized.

The output of these shifters is supplied to a 64 bit adder/subtractor 420. During execution of a simple multiply instruction, a product can be written to a destination register from shifter 411 via bus 412 for a one delay slot result. The output of shifter 410 is generally supplied to the lower portion of the 64 bit adder/subtractor bits (47:0) depending upon the selected shift. Similarly, the output of shifter 411 is generally supplied to the upper portion of the 64 bit adder bits (63:0) depending upon the selected shift. The 64 bit adder operates in the redundant sign/magnitude coding scheme output from the multipliers. In the case of executing a rounding dot product instruction, both products are supplied to the least significant 32 bits of each adder input port in response to the selected shift values. Thus, a 32 bit combined product is formed by adder 420 during execution of a rounding dot product instruction. In the present embodiment, a dot product with shift and round (DOTRS) instruction directs adder 420 to add the first product to the second product. A different instruction, dot product with negate, shift and round (DOTPNRS) directs adder 420 to subtract the second product from the first product.

Mid-point rounding signal MRND is connected to adder 420 as an additional input to bit 15, the sixteenth bit, and is asserted when a rounding dot product instruction is executed. This has the effect of adding a mid-position rounding value of 0x8000 to the combined product. This bit input is referred to as a "ram"0 bit such that the value of 0x8000 is "rammed" into the combined product. Thus, an intermediate result for a dot product instruction is formed at the output of adder 420 as a 32-bit sign extended integer value with mid-position rounding.

Adder 430 receives the 16 lsbs 15:00 422 output from adder 420 and adds them to either the 16 middle lsb bits 423 output from adder 420 or to a value of 0 as selected by multiplexor 432. During execution of a rounding dot product instruction, mux 432 selects "0" so that the 16 lsbs are passed unmodified to shifter 440 on bus 434. Middle lsb bus 423 provides bits 31:16 output from adder 420 to shifter 440, while bus 424 provides bit signals 63:32 output from adder 420 to shifter 440.

Shifter 440 provides of fixed value shift of either zero bits or sixteen bits. During execution of a rounding dot product instruction, shifter 440 is selected to provide a right shift of sixteen bits.

Carry save adder to 2's compliment converter 450 receives the shifted results from shifter 440. The sum output of 64 bit adder/subtractor 420 is converted into the normal coding via this converter. Converter 450 is configured on an instruction by instruction basis to be a single 64 bit unit, two 32 bit units or four 16 bit units depending upon the instruction coding in the op code. When configured as a single 64 bit unit, the lower 32 bits (bits 31:0) are stored in the even register of a register pair and the upper 32 bits (bits 63:32) are stored in the odd register of the register pair. When executing a rounding dot product instruction, converter 450 is configured as two 32 bit units and a final result is stored in a destination register during execution phase E4 of the instruction execution pipeline. The operation and function of converter 450 is not germane to the present invention. Another embodiment of the present invention may use a different number representation scheme.

Galois field multiply unit 460 performs Galois multiply in parallel with multiplier mpy0, mpy1. For output from the M unit, the Galois multiply result is muxed with the multiply result.

Details of the Galois multiply unit are provided in co-assigned U.S. patent application Ser. No. 09/507,187 to David Hoyle entitled Galois Field Multiply and is incorporated herein by reference.

Figure 5:
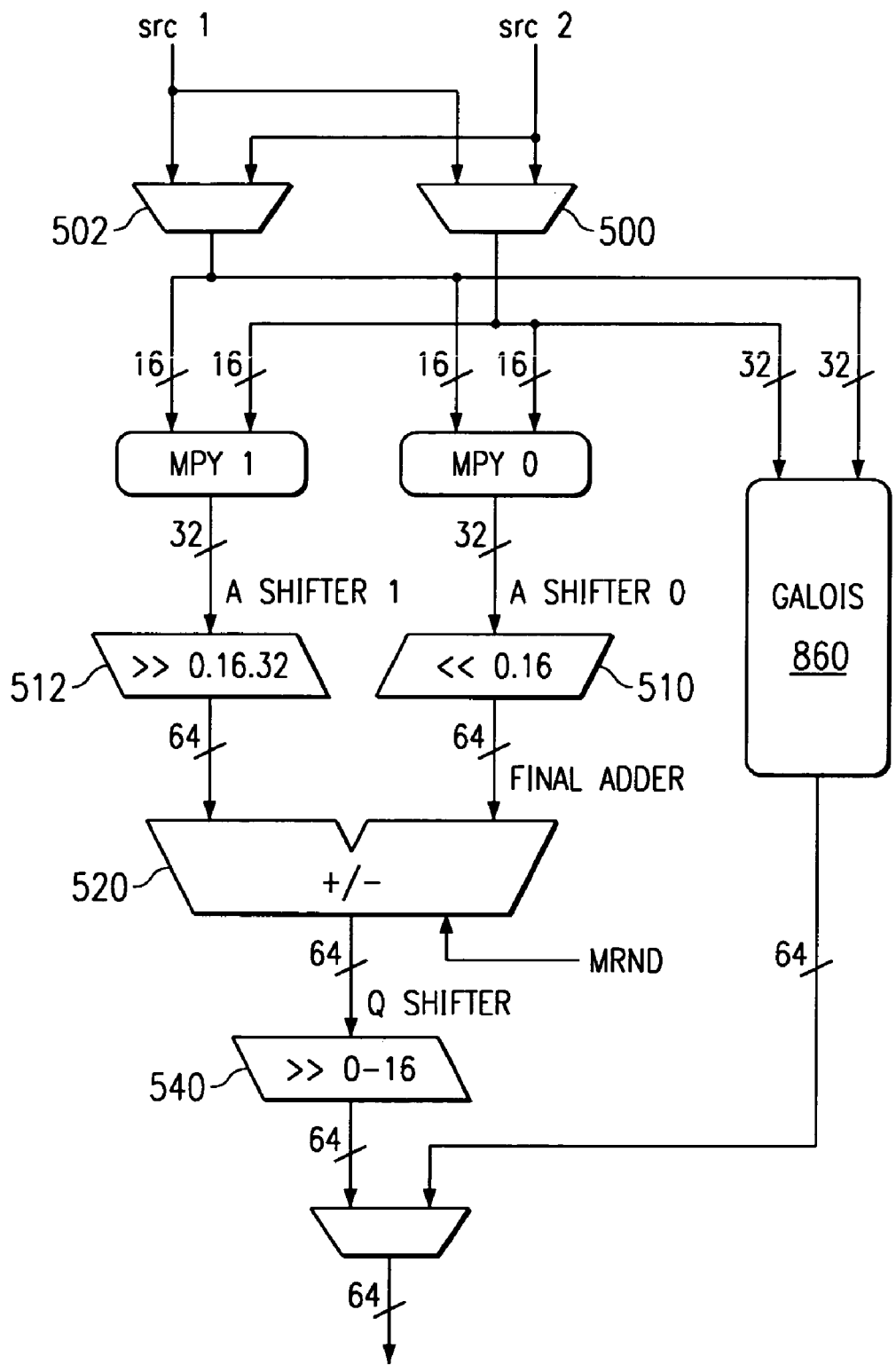
FIG. 5 is a block diagram of an alternative embodiment of paired multipliers that can be used in a digital system to embody the present invention.

FIG. 5 is a block diagram of an alternative embodiment of an M unit with paired multipliers that can be used in a digital system to embody the present invention. The M unit includes a pair of 16 by 16 multipliers mpy0, mpy1 and auxiliary hardware to enable a large number of multiply functions. The M unit receives two register inputs (src1 and src2) and generates a 64 bit output to an even/odd pair of registers. Each multiplier receives two 16 bit inputs. These may be independently selected as the upper/lower 16 bits of the 32 bit data word recalled from the src1 and src2 operand registers via selectors 500, 502. Each multiplier uses part of src1 and part of src2. The part used (upper/lower 16 bits) is independently selectable via op code. Each multiplier has a size input enabling selection of a single 16 by 16 bit multiply or a pair of 8 by 8 bit multiplies.

Shifters 510, 512 have fixed shift functions coded in the op code of certain instructions. These are selected from a limited set of shifts. Shifter 510 corresponding to mpy0 may select a 0 bit shift or a 16 bit left shift. Shifter 512 corresponding to mpy1 may select 0 bit shift, a 16 bit right shift, or a 32 bit right shift. The shift operation may generally be applied to the separate upper/lower 16 bit parts of the product of each multiplier. When a rounding dot product instruction is executed, shifter 510 is set to provide a 0 bit shift and shifter 512 is set to provide a 32-bit right shift so that both products are normalized.

The output of these shifters is supplied to a 64 bit adder/subtractor 520. The output of shifter 510 is generally supplied to the lower portion of the 64 bit adder/subtractor bits (47:0) depending upon the selected shift. Similarly, the output of shifter 512 is generally supplied to the upper portion of the 64 bit adder bits (63:0) depending upon the selected shift. In the case of executing a rounding dot product instruction, both products are supplied to the least significant 32 bits of each adder input port in response to the selected shift values. Thus, a 32 bit combined product is formed by adder 520 during execution of a rounding dot product instruction.

Mid-point rounding signal MRND is connected to adder/subtractor 520 as a additional input to bit 15 and is asserted when a rounding dot product instruction is executed. This has the effect of adding a mid-position rounding value of 0x8000 to the combined product. This bit input is referred to as a "ram"0 bit such that the value of 0x8000 is "rammed" into the combined product Thus, an intermediate result for a dot product instruction is formed at the output of adder 520 as a 32-bit sign extended integer value with mid-position rounding.

Shifter 540 provides shift ranging from zero bits to sixteen bits. During execution of a rounding dot product instruction, shifter 540 is selected to provide a right shift of sixteen bits. In this embodiment, no converter is required.

Figure 6:
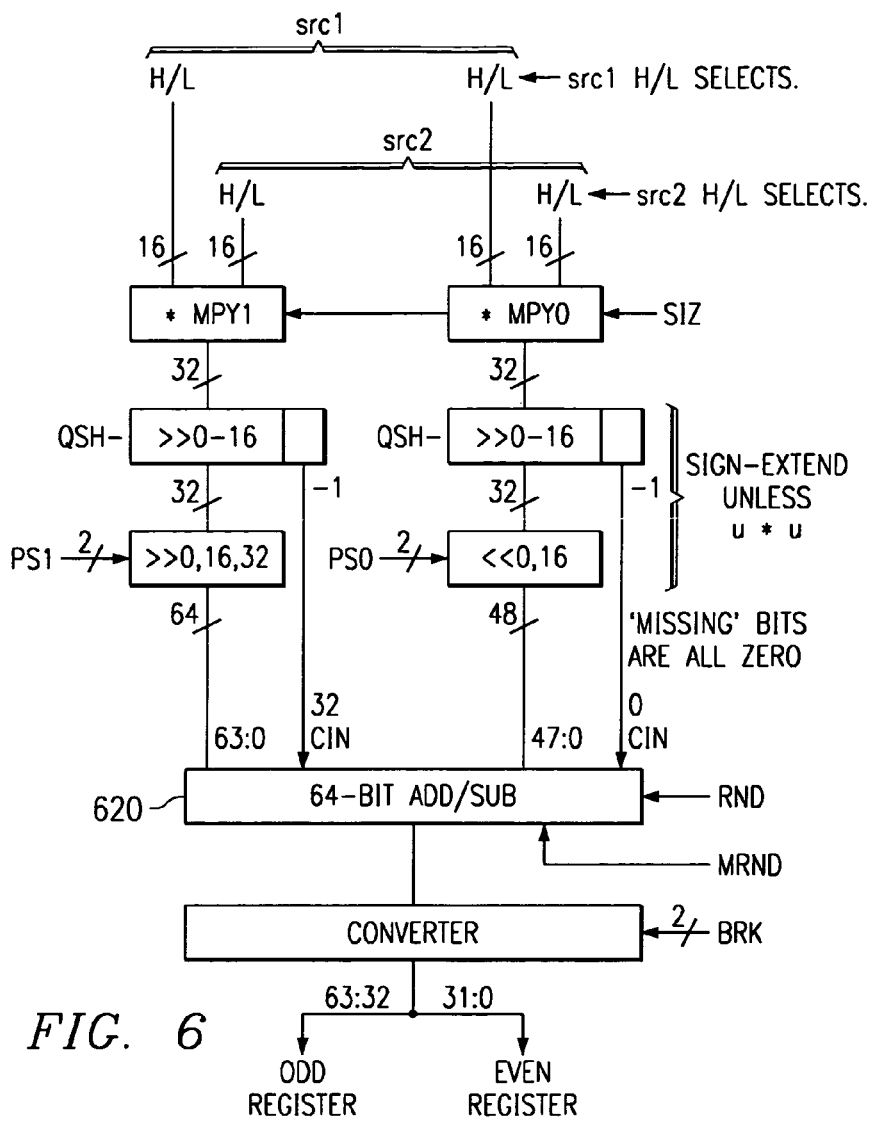
FIG. 6 is a block diagram of another alternative embodiment of paired multipliers that can be used in a digital system to embody the present invention.

FIG. 6 is a block diagram of an alternative embodiment of an M unit with paired multipliers that can be used in a digital system to embody the present invention. In this embodiment, the M unit includes a pair of 16 by 16 multipliers mpy0, mpy1 and auxiliary hardware to enable a large number of multiply functions. M unit receives two register inputs (src1 and src2) and generates a 64 bit output to an even/odd pair of registers. Each multiplier receives two 16 bit inputs. These may be independently selected as the upper/lower 16 bits of the 32 bit data word recalled from the src1 and src2 operand registers. Each multiplier uses part of src1 and part of src2. The part used (upper/lower 16 bits) is independently selectable via op code. Each multiplier has a size input enabling selection of a single 16 by 16 bit multiply or a pair of 8 by 8 bit multiplies.

The redundant sign/magnitude coded output of the two multipliers go to shift and addition hardware. First, the 32-bit output of each multiplier goes to a corresponding one of a pair of 0-16 bit right shifters. These shifters are controlled in a ganged fashion from bits in the op code and are used primarily for result scaling in multiply accumulate operations to avoid overflow. Q shifters can couple most significant shifted out bit to a carry-in input of corresponding section of 64 bit adder/subtractor to implement rounded scaling.

The Q shifter output then goes to corresponding P shifters. The P shifters have fixed shift functions coded in op code. These are selected from a limited set of shifts. PS0 corresponding to mpy0 may select a 0 bit left shift or a 16 bit right shift. In the most general form these shift amounts can be separately applied to the upper/lower 16 bits of the data. However, only some of these combinations are coded. PS1 corresponding to inpy1 may select a 0 bit right shift, a 16 bit right shift or a 32 bit right shift, which may generally be applied to the separate upper/lower 16 bit parts but my be coded with more limited capability.

The output of the P shifters is supplied to a 64 bit adder/subtractor 620. The output of PS0 is generally supplied to the lower portion of the 64 bit adder/subtractor bits (47:0) depending upon the selected shift. Similarly, the output of PS1 is generally supplied to the upper portion of the 64 bit adder bits (63:0) depending upon the selected shift. This 64 bit adder/subtractor receives and may use for rounding the most significant shifted out bits of the Q shifters. 64 bit adder 620 operates in the redundant sign/magnitude coding output from the multiplier. In the case of executing a rounding dot product instruction, both products are supplied to the least significant 32 bits of each adder input port in response to shift values selected in response to the rounding dot product opcodes. Thus, a 32 bit combined product is formed by adder 620 during execution of a rounding dot product instruction.

Mid-point rounding signal MRND is connected to adder 620 as an additional input to bit 15 and is asserted when a rounding dot product instruction is executed. This has the effect of adding a mid-position rounding value of 0x8000 to the combined product. This bit input is referred to as a "ram"0 bit such that the value of 0x8000 is "rammed" into the combined product. Thus, an intermediate result for a dot product instruction is formed at the output of adder 620 as a 32-bit sign extended integer value with mid-position rounding.

The sum output of 64 bit adder/subtractor 620 is then converted into the normal coding via a converter. This converter may be employed as a single 64 bit unit, two 32 bit units or four 16 bit units depending upon a BRK coding in the op code. The lower 32 bits (bits 31:0) are stored in the even register of a register pair. The upper 32 bits (bits 63:33) are stored in the odd register of the register pair.

Additional information on embodiments of paired multiplier circuits is provided in co-assigned U.S. patent application Ser. No. 09/703,093 to David Hoyle entitled Data Processor with Flexible Multiply Unit and is incorporated herein by reference.

Other System Examples

Several example systems which can benefit from aspects of the present invention are described in U.S. Pat. No. 5,072,418, which was incorporated by reference herein, particularly with reference to FIGS. 2-18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 7:
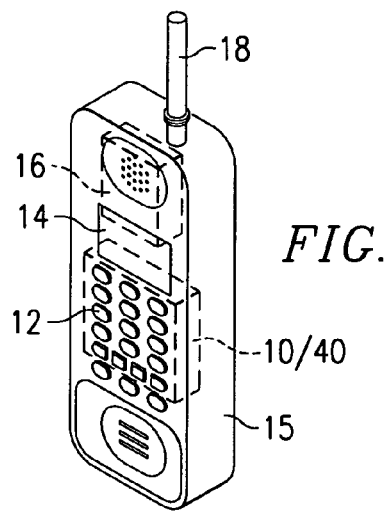
FIG. 7 is an illustration of a wireless telephone digital system that embodies the present invention.

FIG. 7 illustrates an exemplary implementation of an example of an integrated circuit 40 that includes digital system 1 in a mobile telecommunications device, such as a wireless telephone with integrated keyboard 12 and display 14. As shown in FIG. 7, digital system 1 with processor 10 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication

Fabrication of digital system 1 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality. An integrated circuit that includes any of the above embodiments includes a plurality of contacts for surface mounting. However, the integrated circuit could include other configurations, for example a plurality of pins on a lower surface of the circuit for mounting in a zero insertion force socket, or indeed any other suitable configuration.

Digital system 1 contains hardware extensions for advanced debugging features. These assist in the development of an application system. Since these capabilities are part of the CPU core itself, they are available utilizing only the JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

Thus, a functional unit in a digital system is provided with a rounding DOT product instruction, wherein a product of a first pair of elements is combined with a product of a second pair of elements, the combined product is rounded and shifted, and the final result is stored in a destination. Rounding is performed by adding a rounding value to form an intermediate result, and then shifting the intermediate result right. A combined result is rounded to a fixed length shorter than the combined product. The products are combined by either addition or subtraction. An overflow resulting from the combination or from rounding is not reported.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, more than two multiply circuits can be conjoined to provide even greater flexibility than a pair of multipliers, such that a matching number of pairs of input values are packed into the source operands. Other boundaries can be defined, such as a plurality of twelve bit multipliers, for example. A single M unit can be embodied in a digital system, or more the two M units can be embodied in a single digital system, for example.

Within an M unit, various combinations of fixed and/or variable shifters can be provided. Other mid-point rounding locations may be selected such that the rounding value is $2^n$ and the intermediate result is shifted n+1. For example a rounding value of $2^{11}$ with a twelve bit right shift. Alternatively, instead of performing a right shift of n+1, a left shift can be performed to shift the final result to a more significant portion of a 64-bit output register, for example, to form a final result such that the n lsbs of the intermediate result stored in a destination register are truncated.

Other embodiments may report overflow as a status bit, for example, during product combination or rounding; software can then choose to ignore the overflow indications.

Another embodiment may treat both values of each pair of elements as signed numbers, or may treat both values of each pair of elements as unsigned numbers, for example.

In another embodiment, a prior final result is retrieved from a destination location and is combined with a current final result and the accumulated final result is stored at the destination location.

It is therefore contemplated that the appended claims will cover any such modifications of the embodiments as fall within the true scope and spirit of the invention.

What is claimed is:

1. A data processing apparatus comprising:
a first multiply circuit having first and second inputs and an output, said first multiply circuit operable in response to a dot product instruction to multiply data received at said first and second inputs and generate a first product at said output;
a first Q shifter having an input receiving said first product from said first multiply circuit and an output, said first Q shifter shifting said first product an instruction specified number of bits responsive to the rounding dot product instruction;
a second multiply circuit having first and second inputs and an output, said second multiply circuit operable in response to a dot product instruction to multiply data received at said first and second inputs and generate a second product at said output;
a second Q shifter having an input receiving said second product from said second multiply circuit and an output said second Q shifter shifting said second product said instruction specified number of bits responsive to the rounding dot product instruction;
an adder/subtractor circuit having first and second inputs, a mid-position carry input to a predetermined bit and an output, said first input receiving said shifted first product from first Q shifter, said second input receiving said shifted second product from said second Q shifter, said adder/subtractor circuit operable in response to said dot product instruction to arithmetically combine said first and second products and a "1" input at said mid-position carry input of said predetermined bit thereby forming a mid-position rounded sum; and
a shifter connected to receive said mid-position rounded sum of the adder/subtractor circuit, the shifter operable to shift said mid-position rounded sum a predetermined amount in response to said dot product instruction.

2. A data processing apparatus comprising:
a first multiply circuit having first and second inputs and an output, said first multiply circuit operable in response to a dot product instruction to multiply data received at said first and second inputs and generate a first product at said output, said first multiply generating said first product in a redundant sign/magnitude format;
a second multiply circuit having first and second inputs and an output, said second multiply circuit operable in response to a dot product instruction to multiply data received at said first and second inputs and generate a second product at said output, said second multiply circuit generating said second product in said redundant sign/magnitude format;
an adder/subtractor circuit having first and second inputs, a mid-position carry input to a predetermined bit and an output, said first input receiving said first product from said first multiply circuit, said second input receiving said second product from said second multiply circuits, said adder/subtractor circuit operable in response to said dot product instruction to arithmetically combine said first and second products and a "1" input at said mid-position carry input of said predetermined bit thereby forming a mid-position rounded sum, said adder/subtractor circuit arithmetically combining said first and second products and said "1" input at said mid-position carry input forming said mid-position rounded sum in said redundant sign/magnitude format;
a shifter connected to receive said mid-position rounded sum of the adder/subtractor circuit, the shifter operable to shift said mid-position rounded sum a predetermined amount in response to said dot product instruction, said shifter shifting said mid-position rounded sum in said redundant sign/magnitude format; and
a carry save adder to 2's complement converter having an input receiving said shifted mid-position rounded sum in said redundant sign/magnitude format from said shifter and an output generating a corresponding normal coded format.

* * * * *